USO06775677B1

(12) United States Patent
Ando et al.

(10) Patent No.: US 6,775,677 B1
(45) Date of Patent: Aug. 10, 2004

(54) SYSTEM, METHOD, AND PROGRAM PRODUCT FOR IDENTIFYING AND DESCRIBING TOPICS IN A COLLECTION OF ELECTRONIC DOCUMENTS

(75) Inventors: Rie Kubota Ando, Ithaca, NY (US); Branimir Konstantinov Boguraev, Bedford, NY (US); Roy Jefferson Byrd, Ossining, NY (US); James William Cooper, Wilton, CT (US); Mary Susan Neff, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/517,540

(22) Filed: Mar. 2, 2000

(51) Int. Cl.[7] ............................................... G06F 17/00

(52) U.S. Cl. ........................... 707/102; 707/3; 707/100; 707/101

(58) Field of Search ....................... 707/1–10, 100–102; 715/511, 513, 526, 528; 345/856–862

(56) References Cited

U.S. PATENT DOCUMENTS

| | | | |
|---|---|---|---|
| 5,696,533 A | * 12/1997 | Montgomery et al. | ...... 345/823 |
| 5,774,888 A | 6/1998 | Light | |
| 5,794,178 A | * 8/1998 | Caid et al. | ...................... 704/9 |
| 5,857,179 A | * 1/1999 | Vaithyanathan et al. | ........ 707/2 |
| 5,937,422 A | 8/1999 | Nelson et al. | |
| 6,466,240 B1 | * 10/2002 | Maslov | ........................ 345/853 |

OTHER PUBLICATIONS

Chris H.Q. Ding, "A Similarity–based Probability Model for Latent Semantic Indexing," Proceedings of SIGIR '99 22nd International Conference on Research and Development in Information Retrieval, pp. 58–65, 1999.

* cited by examiner

Primary Examiner—Jean M. Corrielus
Assistant Examiner—Joon Hwan Hwang
(74) Attorney, Agent, or Firm—Louis J. Percello, Esq.

(57) ABSTRACT

To identify and describe one or more topics in one or more documents in a document set, a term set process creates a basic term set from the document set where the term set comprises one or more basic terms of one or more words in the document. A document vector process then creates a document vector for each document. The document vector has a document vector direction representing what the document is about. A topic vector process then creates one or more topic vectors from the document vectors. Each topic vector has a topic vector direction representing a topic in the document set. A topic term set process creates a topic term set for each topic vector that comprises one or more of the basic terms describing the topic represented by the topic vector. Each of the basic terms in the topic term set associated with the relevancy of the basic term. A topic-document relevance process creates a topic-document relevance for each topic vector and each document vector. The topic-document relevance representing the relevance of the document to the topic. A topic sentence set process creates a topic sentence set for each topic vector that comprises of one or more topic sentences that describe the topic represented by the topic vector. Each of the topic sentences is then associated with the relevance of the topic sentence to the topic represented by the topic vector.

16 Claims, 6 Drawing Sheets

SYSTEM, METHOD, AND PROGRAM PRODUCT FOR IDENTIFYING AND DESCRIBING TOPICS IN A COLLECTION OF ELECTRONIC DOCUMENTS

FIELD OF THE INVENTION

This invention relates to the field of digital libraries. More specifically, the invention relates to the field the searching and describing documents in a digital library and/or over a network.

BACKGROUND OF THE INVENTION

To utilize electronic documents efficiently, a technology which helps the user to understand the documents quickly is essential. In particular, there are many occasions where users need to look at more than one document at a time. An example is when the user gets query results from a search system.

Typically, the query result is returned in the format of a hit list. The hit list is a conventional method to visualize and summarize a set of documents resulting from a query. It contains the document titles and/or brief descriptions, which may be prepared by hand or automatically. It is generally sorted in the order of the documents' relevance to the query. Examples may be found at http://yahoo.com and http://altavista.com, on the World Wide Web.

Clustering techniques can be used to give the user an overview of a set of documents. A typical document clustering algorithm divides the documents into groups (clusters) so that the documents in a cluster are similar to one another and are less similar to documents in other clusters, based on some similarity measurement. Each cluster can have a cluster description, which is typically one or more words or phrases frequently used in the cluster.

Much work has been done on visualization of document collections, which intends to visualize the relationships among documents. This work is generally based on clustering or a proprietary space conversion technique focusing on a large number of documents, such as a whole corpus. An example of this approach is U.S. patent application Ser. No. 5,794,178, inventors Caid, et al., entitled "Visualization of information using graphical representations of context vector based relationships and attributes", filed Aug. 11, 1998. It generates context vectors representing conceptual relationships among items, and further facilitates comprehension and use of textual information using visual and graphical representations.

The existing text summarization methods are mainly for single documents. They are generally based on sentence extraction or sentence generation. There is some research work on multiple document summarization. In general, the existing multiple document summarization method assumes a homogeneous set of documents as input, such as successive news stories on the same topic. These techniques extract sentences in ways which avoid including duplicate sentences or they generate a sentences by merging similar ones.

Documents can be expressed as multidimensional data. Traditionally, factor analysis and multivariate analysis are used to analyze multidimensional data and detect the distinctive features of the data.

PROBLEMS WITH THE PRIOR ART

The conventional hit list shows the information for each document in a query result; to use it, the user has to go through the list one document at a time. The hit list shows the degree of relevance of each document to the query. However, it fails to show how the documents are related to one another.

A clustering program can be used to show which documents discuss similar topics. However, in general, a clustering program does not output explanations of each cluster (cluster labels) or, if it does, it still does not provide enough information for the user to understand the document set. For instance, U.S. patent application Ser. No. 5,857,179, inventors Vaithyanathan et al., entitled "Computer method and apparatus for clustering documents and automatic generation of cluster keywords", filed Jan. 5, 1999, outputs cluster labels containing representative terms for each cluster. However, the labels alone do not provide enough information. Typically, clustering programs tend to focus on grouping documents, and it fails to describe the main topic underlying in each cluster.

When existing single document summarization methods are applied to a document set, they have the same problem as hit lists. That is, they fail to show how the documents are related to one another.

The typical existing multiple document summarization method assumes a homogeneous set of documents as input. It fails to show how multiple topics and multiple documents are related to each other in the heterogeneous document sets.

Document visualization work generally focuses on a large number of documents to provide coarser-grained information. In general, the information provided by document visualization is too coarse-grained to be useful as a summarization for a smaller number (e.g. 50) of documents.

Factor analysis and multivariate analysis are intended to be used for general multidimensional data, and a human needs to interpret its analysis results. For the purpose of multiple document summarization, they fail to provide human-comprehensible interpretation of the analysis results.

U.S. patent application Ser. No. 5,937,422, inventors Nelson et al., entitled "Automatically generating a topic description for text and searching and sorting text by topic using the same", filed Aug. 10, 1999, creates a word list as a topic description of the input text. It searches and sorts documents by comparing the similarity of the topic descriptions. However, it fails to summarize the relationships among multiple documents and multiple topics.

U.S. patent application Ser. No. 5,774,888, inventor Light, entitled "Method for characterizing a document set using evaluation surrogates," filed Jun. 30, 1998, characterizes a document set using topic profiles. It needs the topic profiles predefined and fails to characterize the document set containing undefined topics.

These cited references are herein incorporated by reference in their entirety.

OBJECTS OF THE INVENTION

An object of this invention is a system, method, and program for identifying and describing topics in a collection of electronic documents.

Another object of this invention is a system, method, and program for identifying and describing topics in a collection of electronic documents and describing topics of related electronic documents in a group.

SUMMARY OF THE INVENTION

This invention is a computer system, method, and program product for identifying and describing one or more topics in one or more documents in a document set. A term set process creates a basic term set from the document set where the term set comprises one or more basic terms of one or more words in the document. A document vector process then creates a document vector for each document. The document vector has a document vector direction representing what the document is about. A topic vector process then creates one or more topic vectors from the document vectors. Each topic vector has a topic vector direction representing a topic in the document set. A topic term set process creates a topic term set for each topic vector that comprises one or more of the basic terms describing the topic represented by the topic vector. Each of the basic terms in the topic term set associated with the relevancy of the basic term. A topic-document relevance process creates a topic-document relevance for each topic vector and each document vector. The topic-document relevance representing the relevance of the document to the topic. A topic sentence set process creates a topic sentence set for each topic vector that comprises of one or more topic sentences that describe the topic represented by the topic vector. Each of the topic sentences is then associated with the relevance of the topic sentence to the topic represented by the topic vector.

BRIEF DESCRIPTION OF THE FIGURES

The foregoing and other objects, aspects, and advantages will be better understood from the following non-limiting detailed description of preferred embodiments of the invention with reference to the drawings that include the following.

DETAILED DESCRIPTION OF THE INVENTION

This invention is a program to summarize or characterize the contents of a document collection so that the user can easily understand what the documents are about. It does this by detecting major topics of the documents and describing the detected topics by visual and textual information. This program can be integrated into an information retrieval system for the purpose of summarizing query results. It can also be integrated into a clustering program for the purpose of summarizing each cluster. This program is intended to be applied to a small document collection, e.g. a hundred documents or fewer. Unlike typical clustering algorithms, this program focuses on identifying and summarizing the topics in the document collection rather than simply identifying document clusters. It can be used both for homogeneous document collections and heterogeneous ones.

This program detects topics in the given documents so that every document is closely related to at least one topic. The detected topics are shown to the user in the form of extracted words, phrases, and sentences. In addition to words, phrases, and sentences, visual information, called a document map, is shown to the user using color gradation and positional differentiation so that the user can understand the following information at a first glance:

how each document is related to each topic and how many documents are closely related to each topic.

The user can do the following operations interactively:

get full text of a document by clicking the image (typically a dot) representing the document. This image is positioned based on how relevant the document is to the topic.

get full text of the document from which the sentence describing a topic is extracted and see the extracted sentence in context.

see how two topics are related to each other by selecting two topics to make a document map.

recursively summarize a subset of documents, for finer granularity.

Refer now to the figures.

Figure 1:
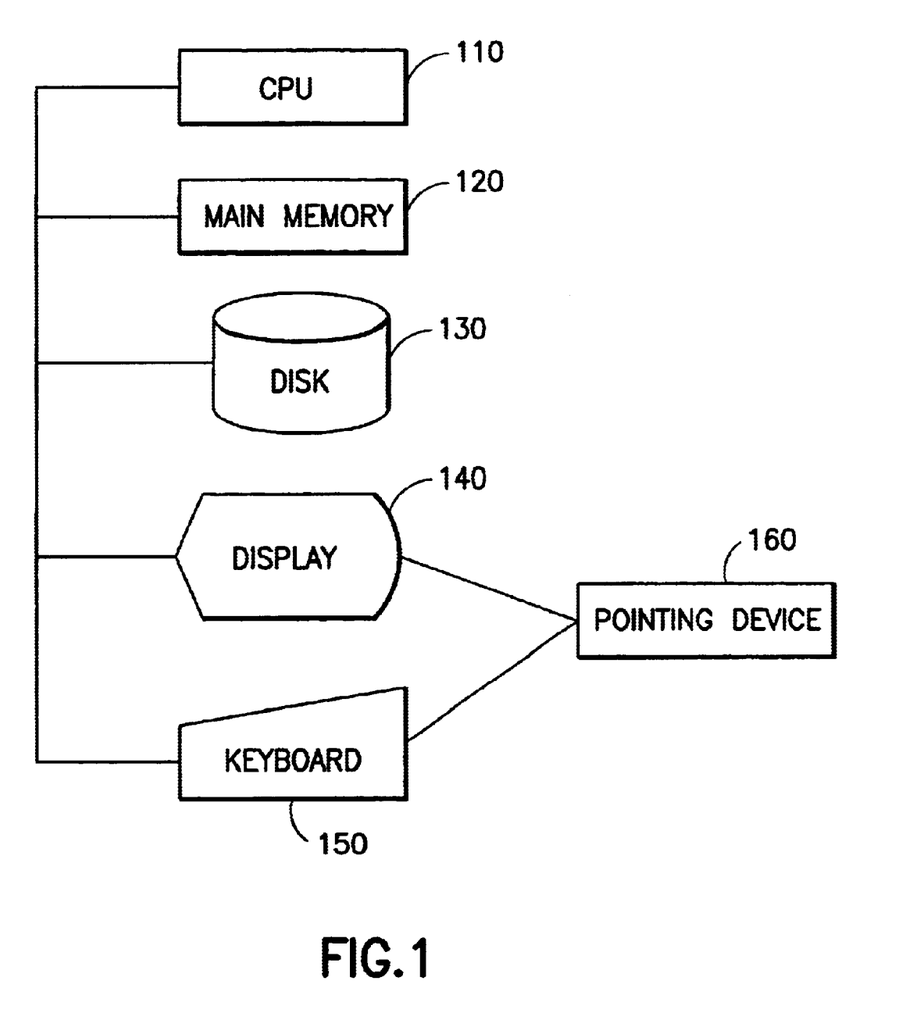
FIG. 1 is a block diagram of one preferred embodiment of a system using the present invention.

FIG. 1 shows the components of a computer system which provides the execution environment for the preferred embodiment of this invention. The system contains a central processing unit (CPU) 110 which executes the processes of the invention. The main memory 120 contains the programs which comprise the invention's processes as well as the data produced by and operated on by those programs. The disk 130 provides long term storage for the documents operated on by the invention as well as other persistent data required by embodiments of the invention.

The computer system also includes a display 140, on the surface of which the program presents visualizations of the underlying data objects in order to facilitate comprehension and navigation by the system's human users. Control of the display and of the program are provided by the keyboard 150 and the pointing device 160 and/or any other well known input devices. The functions and uses of the display and pointing device are further detailed in the discussion of FIG. 5, below.

Figure 2:
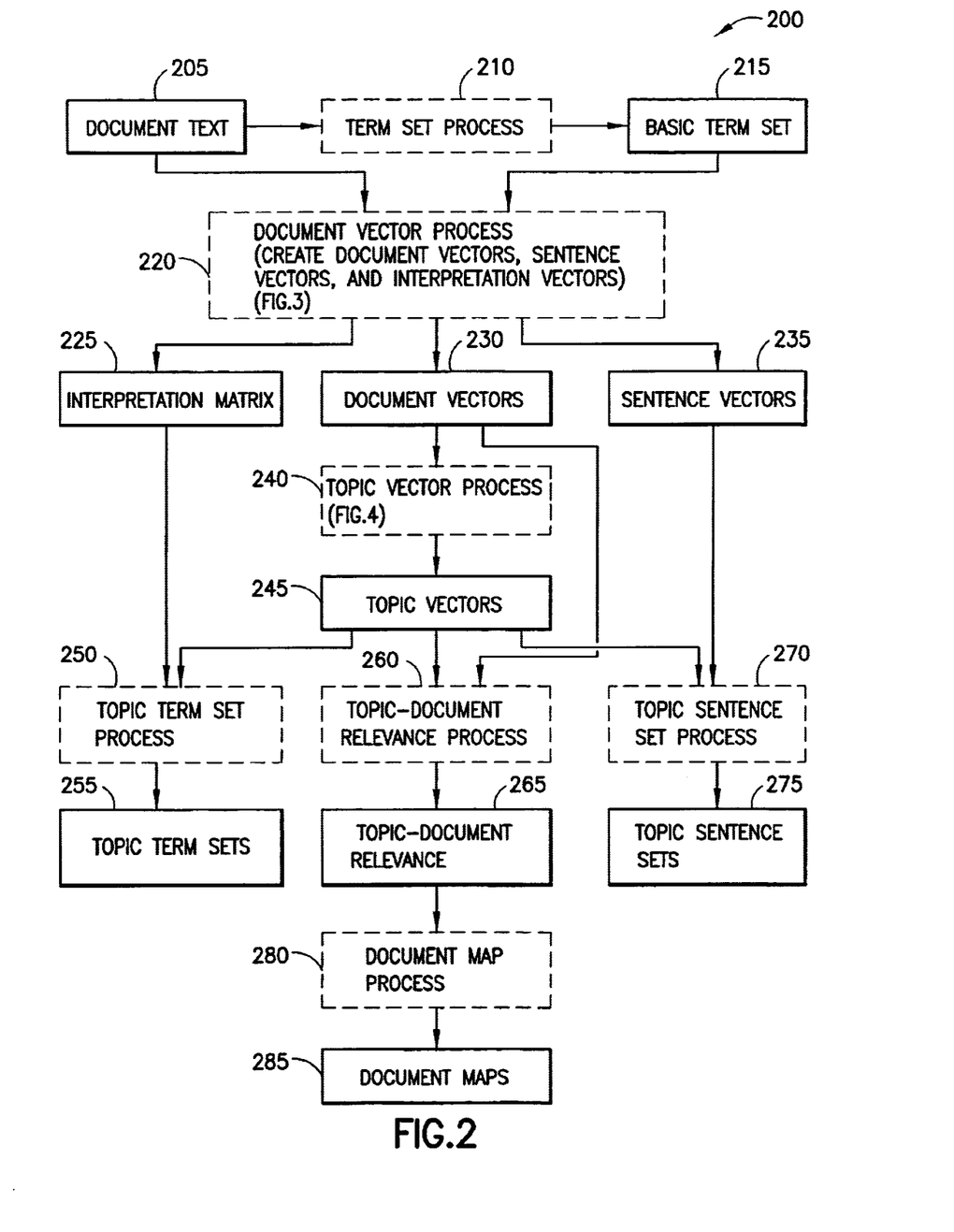
FIG. 2 is a flow chart of an overall process performed by the present invention.
Figure 3:
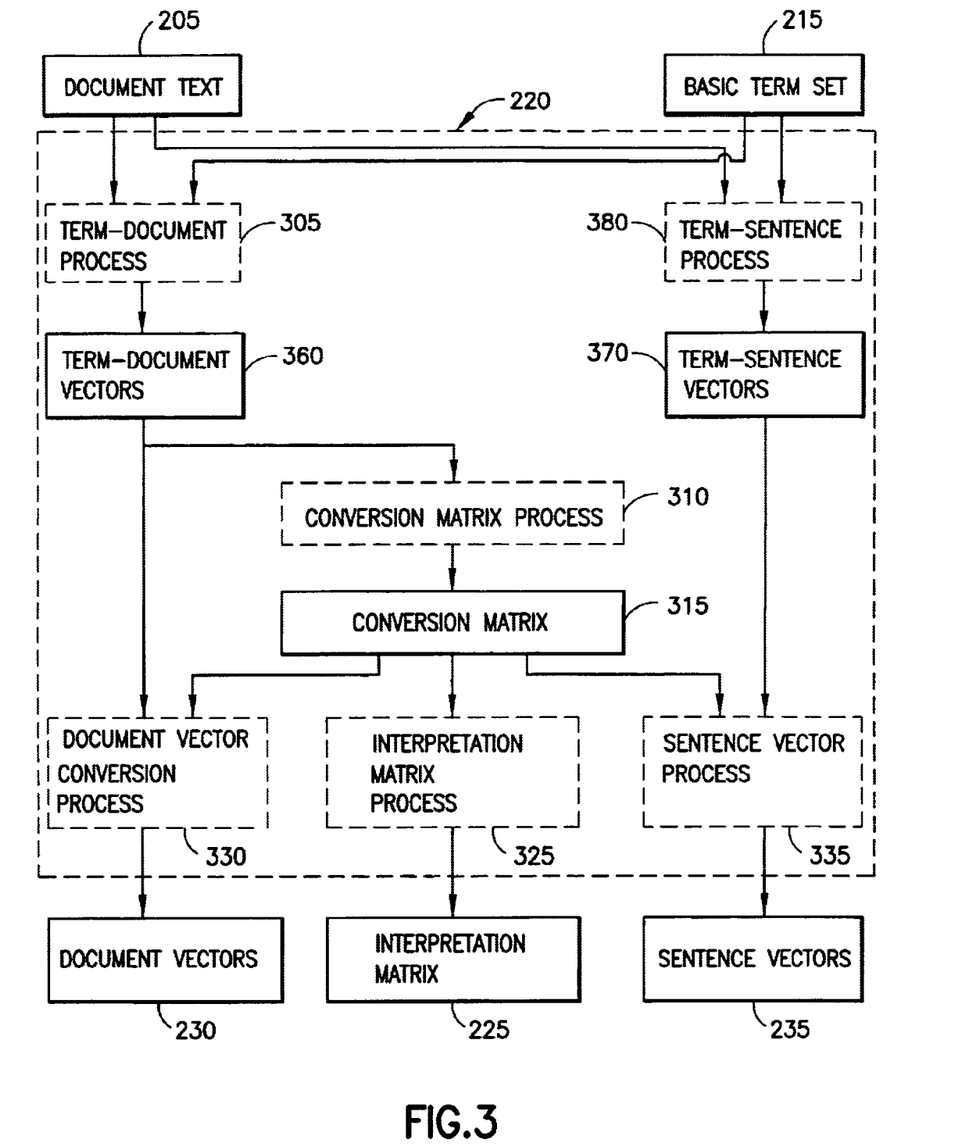
FIG. 3 is a flow chart of a process that creates document vectors, an interpretation matrix, and sentence vectors.
Figure 4:
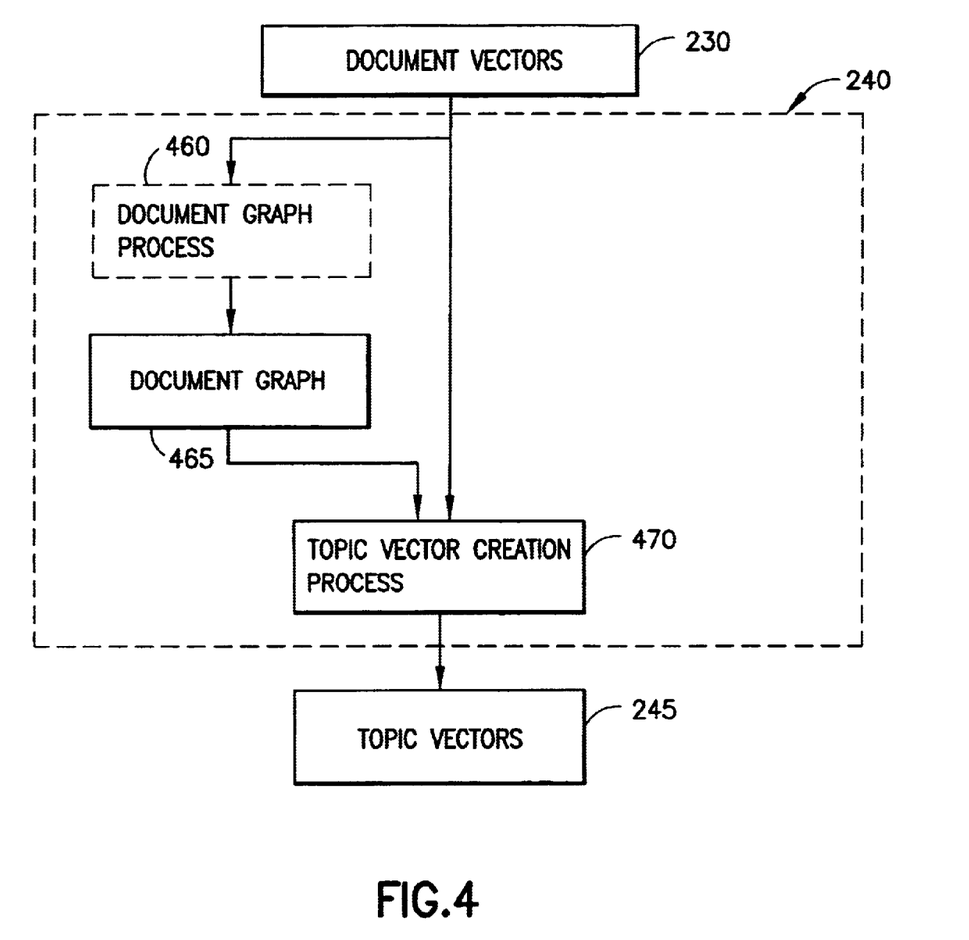
FIG. 4 is a flow chart of a topic vector process.

FIG. 2 shows the overall flow of one preferred novel process performed by this invention. In FIG. 2, 3, and 4, the rectangles with solid lines represent data, and the ones with dotted lines represent computer program processes.

The input of this program is document text of a given set of documents labeled 205.

Table 1 shows an example of document text.

Document #1

Mary Jones has a little lamb. The lamb is her good buddy.

Document #2

Mary Jones is a veterinarian for Cornell University. Cornell University has many lambs.

Document #3

Mike Smith is a programmer for IBM.

Table 1. Example of document text

A term set process, labeled 210 of FIG. 2, creates a basic term set labeled 215 from the document text labeled 205 of the given document set. In this process, first all terms contained in the documents are extracted using any existing term extraction technology. A term may be one word or a sequence of more than one word. Next, common terms, such as "a" and "is", are removed from the extracted terms using any existing term weighting technology, a stop word list, or any other known technique. The set of the remaining terms is called a basic term set. Table 2 shows an example of the basic term set created from the document text example in Table 1.

{"Mary Jones", "little", "lamb", "good buddy", "veterinarian", "Cornell University", "Mike Smith", "programmer", "IBM"}

Table 2. Example of basic term set.

"had", "a", "her", "is", "many", and "for" are removed as stop words.

A document vector process labeled 220 creates document vectors labeled 230, sentence vectors labeled 235, and an interpretation matrix labeled 225 from the document text labeled 205 and the basic term set labeled 215. The document vector process encodes the basic terms into linear combinations of the basic terms. It associates a linear combination of the basic terms with each document vector and with each sentence vector. The interpretation matrix keeps the information needed to decode the linear combinations back to the basic terms. More precisely, [i,j] element of the interpretation matrix represents the degree of association between the jth element of the document vector 230 or sentence vector 235 with the ith basic term.

FIG. 3 shows the details of the document vector process 220.

First, a term-document process labeled 305 creates a term-document vector labeled 360 for each document. Each element of the term-document vector is associated with each basic term. Each vector element represents the degree of relevance of the basic term to the document. The term-document vector is equivalent to the vector of the conventional vector space model used for information retrieval. The vector element can be the occurrence frequency of the basic term in the document. Many other conventions can be used to represent the association of the basic term to the document. The term-document vectors should be normalized to the same length so that every document is treated equally.

Table 3 shows an example of term-document vectors and normalized term-document vectors.

A preferred embodiment of conversion matrix process 310 is as follows:

```
Z = D                           /* Initialize Z with the term-
                                   document matrix */
i = 1
Loop until reaching some criteria
q = f(.)                        /* Determine the scaling factor */
Zs = [|z1|^q z1 ... |zn|^q zn]  /* Scale the column vector of Z by
                                   the qth power of its own length */
bi = the eigenvector of Zs Zs^T
with the largest eigenvalue
Z = Z - [(bi^T z1)bi ... (bi^T zn)bi]  /* Eliminate the direction of bi
                                          from column vectors of Z */
i = i + 1
end of loop
k = g(.)                        /* Determine k */
B = [b1 ... bk]                 /* the conversion matrix */
```

D is a matrix of the term-document vectors, i.e. $D=[d_1 \ldots d_n]$ where $d_i$ is the term-document vector for the ith document and n is the number of documents. A matrix Z is initialized with the term-document matrix, and its ith column vector keeps the information of the ith term-document vector that has not been encoded to the conversion matrix yet. In each iteration, each column vector of Z is scaled by the qth power of its own length. The eigenvector of $Z_s Z_s^T$ with the largest eigenvalue is computed as $b_i$ in the ith iteration. After determining the value of k, $B=[b_1 \ldots b_k]$ is the desired conversion matrix.

TABLE 3

Example of term-document vectors.

Term document vectors created using occurrence frequency:

|  | "Mary Jones" | "Little" | "lamb" | "good buddy" | "veterinarian" | "Cornell Univ." | "Mike Smith" | "programmer" | "IBM" |
|---|---|---|---|---|---|---|---|---|---|
| Document #1 [ | 1, | 1, | 2, | 1, | 0, | 0, | 0, | 0, | 0 ] |
| Document #2 [ | 1, | 0, | 1, | 0, | 1, | 2, | 0, | 0, | 0 ] |
| Document #3 [ | 0, | 0, | 0, | 0, | 0, | 0, | 1, | 1, | 1 ] |

Term-document vectors after length normalization:

|  | "Mary Jones" | "Little" | "lamb" | "good buddy" | "veterinarian" | "Cornell Univ." | "Mike Smith" | "programmer" | "IBM" |
|---|---|---|---|---|---|---|---|---|---|
| Document #1 [ | 0.38, | 0,38 | 0.76, | 0.38, | 0, | 0, | 0, | 0, | 0 ] |
| Document #2 [ | 0.38, | 0, | 0.38, | 0, | 0.38, | 0.76, | 0, | 0, | 0 ] |
| Document #3 [ | 0, | 0, | 0, | 0, | 0, | 0, | 0.58, | 0.58, | 0.58 ] |

Next, a conversion matrix process labeled 310 creates a conversion matrix labeled 315 from the term-document vectors labeled 360. The conversion matrix is used to convert a term-document vector to a document vector by encoding the basic terms into linear combinations of basic terms. There are two purposes for this conversion. One is to reduce the number of dimensions of the vectors. It saves space and running costs of the topic vector process that uses the document vectors. The other is to improve the precision of the similarity measurement among the documents by leaving out the "noise" associated with terms that do not contribute to characterizing the document set.

The ith document vector $d'_i$ is computed by
$d'_i = B^T d_i$

When k is equal to the rank of the term-document matrix (typically n), all information of the term-document vectors are captured in the document vectors. When k is smaller than the rank, some information is truncated. When k is chosen appropriately, the "noise" from the terms that do not contribute to characterizing the documents is removed, and as a result, the precision of the similarity measurement among the resultant document vectors is improved. The value of k can be determined experimentally. It can also be determined so that some function, represented as g(.) in the pseudo-code, is locally or globally optimized. An example of such object functions is the log-likelihood based on Gaussian distribution disclosed by "A Similarity-based Probability Model for Latent Semantic Indexing", Chris H. Q. Ding, Proceedings of SIGIR, 1999, which is herein incorporated by reference in its entirety.

If the scaling factor q is always zero, i.e. if Z's column vectors are not scaled at all, B's column vectors will be the $D D^T$'s eigenvectors which are the left singular vectors of D. The purpose of scaling is to encode the information from every document to the conversion matrix (and the document vectors eventually) as evenly as possible with a smaller k. When q is determined appropriately, the similarity measurement among the resultant document vectors becomes more precise than it is when using the left singular vectors of D as a conversion matrix. The scaling factor q can be determined experimentally. It can also be determined so that some function, represented as f(.) in the pseudo-code, is locally or globally optimized. An example of such object functions is the log-likelihood based on Gaussian distribution disclosed by "A Similarity-based Probability Model for Latent Semantic Indexing", Chris H. Q. Ding, Proceedings of SIGIR, 1999. Another example is a standard deviation of Z's column vectors' lengths.

An alternative embodiment of the conversion matrix process is to make the conversion matrix from the left singular vectors of the term-document matrix D. It is known that any m-by-n real matrix can be decomposed into three matrices (by singular value decomposition or SVD)

$$D = U \Sigma V^T$$

U is an m-by-m matrix $[u_1 \ldots u_m]$ where $u_i$ is the unit eigenvector of $D D^T$ (left singular vector) with the ith largest eigenvalue. V is an n-by-n matrix $[v_1 \ldots v_n]$ where $v_i$ is the unit eigenvector of $D^T D$ (right singular vector) with the ith largest eigenvalue. $\Sigma$ is an rn-by-n matrix whose [i,i] element is a square root of the ith largest eigenvalue of $D D^T$ and $D^T D$ (singular value) and whose [i,j] element is zero if i is not equal to j. SVD is used for many applications such as Latent Semantic Indexing.

The conversion matrix can be created from the first k left singular vectors. In this case, however, the information in documents whose vectors have fewer nearby vectors tend to be largely lost when k is small. This happens because the left singular vectors maximizes the total amount of information captured for a given k ignoring how evenly the information is captured from the documents. Experimental results show that, when the conversion matrix is created by the procedure described above, the cosine similarity measurement of the resultant document vectors is generally more precise than using the left singular vectors.

Another alternative embodiment of the conversion matrix process is to take an m-by-m identity matrix as a conversion matrix where m is the number of dimensions of the term-document vectors. In this case, no conversion is done, and the document vectors are equivalent to the term-document vectors. Although the advantages of the conversion described above are lost, still this is a feasible embodiment. In fact, when the given document set is extremely small or extremely heterogeneous, it is a good option, since the conversion does not make much difference in that case.

Table 4 shows an example of the conversion matrix.

| | | | |
|---|---|---|---|
| 0.45 | 0 | 0 | "Mary Jones" |
| 0.22 | 0 | 0.35 | "little" |
| 0.67 | 0 | 0.35 | "lamb" |
| 0.22 | 0 | 0.35 | "good buddy" |
| 0.22 | 0 | −0.35 | "veterinarian" |
| 0.45 | 0 | −0.71 | "Cornell University" |
| 0 | 0.58 | 0 | "Mike Smith" |
| 0 | 0.58 | 0 | "programmer" |
| 0 | 0.58 | 0 | "IBM" |

Table 4. Example of a conversion matrix

Converted by conversion matrix process 310, the first element of the document vector is associated with 0.45*"Mary Jones"+0.22*"little"+0.67*"lamb"+ 0.22*"good buddy"+0.22*"veterinarian"+ 0.45*"Cornell University", the second element of the document vector is associated with 0.58*"Mike Smith"+0.58*"programmer"+0.58*"IBM", and the third element is associated with 0.35*"little"+0.35*"lamb"+0.35*"good buddy"− 0.35*"veterinarian"−0.71*"Cornell University".

A document vector labeled 230 is created by multiplying the conversion matrix labeled 315 and a term-document vector labeled 360. Table 5 shows an example of the document vectors.

Document #1 [0.84 0 0.53]

Document #2 [0.84 0 −0.53]

Document #3 [0 0 1 0]

Table 5. Example of the document vectors. Each element is associated with a linear combination of the basic terms described in Table 4.

A term-sentence process labeled 380 creates the term-sentence vectors labeled 370. Each element of the term-sentence vector is associated with each basic term. Each vector element represents the degree of association of the basic term to the sentence. The term-sentence vector is equivalent to the vector of the conventional vector space model used for information retrieval when a sentence is treated as a small document. The vector element can be the occurrence frequency of the basic term in the sentence. Many other conventions can be used to represent the association of the basic term to the sentence.

Table 6 shows an example of term-sentence vectors.

TABLE 6

Example of term-sentence vectors.

| | "Mary Jones" | "little" | "lamb" | "good buddy" | "veterinarian" | "Cornell Univ." | "Mike Smith" | "programmer" | "IBM" |
|---|---|---|---|---|---|---|---|---|---|
| Sentence #1 [ | 1, | 1, | 1, | 0, | 0, | 0, | 0, | 0, | 0 ] |
| Sentence #2 [ | 0, | 0, | 1, | 1, | 0, | 0, | 0, | 0, | 0 ] |
| Sentence #3 [ | 1, | 0, | 0, | 0, | 1, | 1, | 0, | 0, | 0 ] |
| Sentence #4 [ | 0, | 0, | 1, | 0, | 0, | 1, | 0, | 0, | 0 ] |
| Sentence #5 [ | 0, | 0, | 0, | 0, | 0, | 0, | 1, | 1, | 1 ] |

A sentence vector process labeled 335 creates a sentence vector labeled 235 by multiplying the conversion matrix labeled 315 and a term-sentence vector labeled 370. Table 7 shows an example of sentence vectors.

| | | | | |
|---|---|---|---|---|
| Sentence #1 [ | 0.89, | 0, | 0.71 | ] |
| Sentence #2 [ | 0.89, | 0, | 0.71 | ] |
| Sentence #3 [ | 1.12, | 0, | −1.06 | ] |
| Sentence #4 [ | 0.89, | 0, | −0.35 | ] |
| Sentence #5 [ | 0, | 1.73, | 0 | ] |

Table 7. Example of the sentence vectors. Each element is associated with a linear combination of the basic terms shown in Table 4.

An interpretation matrix process labeled 325 creates an interpretation matrix labeled 225 from the conversion matrix labeled 315. The interpretation matrix is created by transposing the conversion matrix. The interpretation matrix is used to decode the information encoded in the document vectors. Table 8 shows an example of the interpretation matrix.

TABLE 8

Example of an interpretation matrix created from the conversion matrix in Table 4.

| 0.45 | 0.22 | 0.67 | 0.22 | 0.22 | 0.45 | 0 | 0 | 0 |
|---|---|---|---|---|---|---|---|---|
| 0 | 0 | 0 | 0 | 0 | 0 | 0.58 | 0.58 | 0.58 |
| 0 | 0.35 | 0.35 | 0.35 | −0.35 | −0.71 | 0 | 0 | 0 |

Referring to FIGS. 2 and 4, a topic vector process labeled 240 creates topic vectors labeled 245 from the document vectors labeled 230. Topic vectors represent the distinctive topics in the document set. In a topic vector, each element is associated with a linear combination of basic terms. These linear combinations are drawn from the same inventory as those used in the document vectors and sentence vectors. The t topic vectors represent the directions or orientation of the document vectors and sentence vectors. The topic vectors are created so that every document vector is close to at least one topic vector.

FIG. 4 shows the details of the preferred embodiment of the topic vector process.

To create the topic vectors, first a document graph process labeled 460 creates a document graph labeled 465 from the document vectors. In the document graph, each node represents a document vector, and two nodes have an edge between them if and only if the similarity between the two document vectors is above a threshold, called the tight threshold. As a similarity measurement, cosine, inner product, or any other convention can be used. The tight threshold can be determined experimentally.

Next, a topic vector creation process labeled 470 creates the topic vectors from the document graph. After detecting the connected components in the document graph, it creates the topic vectors from each connected component by applying the following procedure recursively:

Input: a set of document vectors S={dk1, dk2, . . . , dk|S|}
Output: one or more topic vectors
Procedure DetectTopic(S={dk1, dk2, . . . , dk|S|})
   v=the unit eigenvector of [dk1, dk2, . . . , dk|S|] [dk1, dk2, . . . , dk|S|]$^T$ with the largest eigenvalue.
   Loop for each element dki in S
      x=similarity between dki and v
      If x<t then begin /* if similarity is below a threshold */
         divide S into $S_1$ and $S_2$
         Call DetectTopic($S_1$)
         Call DetectTopic($S_2$)
         Exit the procedure
      End if
   End loop
   Return v as a topic vector The unit eigenvector of a covariance matrix of the given document vectors is computed as v. It is a representative direction of the given document vectors. The similarity between v and each document vector in S is computed as x. If x is less than a threshold t, called the loose threshold, for any document vector in S, then S is divided into two sets $S_1$ and $S_2$, and the procedure is called for $S_1$ and $S_2$ recursively. Otherwise, v is returned as a topic vector. As a similarity measurement, cosine, inner product, or any other convention can be used.

S can be divided into two sets $S_1$ and $S_2$ by the following procedure:

Step 1. Create a sub-graph $G_s$ for S from the document graph
Step 2. Compute the minimum cut of all the node pairs in $G_s$.
Step 3. Evaluate each minimum cut, and choose the optimal cut as ($S_1$, $S_2$).

A preferred evaluation function for step 3 is sqrt(|A|*|B|)* f where sqrt denotes square root function and (A,B) is a minimum cut of the given pair, and f denotes the cut value of (A,B). Using this function, a cut that divides S more evenly with a smaller cut value (i.e. with fewer crossing edges) is chosen.

The above is one preferred embodiment of the topic vector process labeled 240. An alternative embodiment of this process is the existing clustering algorithm that takes vectors as input. The topic vectors can be created to be the center vectors of the resultant clusters.

Table 9 shows an example of the topic vectors created from the document vector example of Table 5.

Topic vector #1 [1, 0, 0 ]
Topic vector #2 [0, 1, 0 ]
Table 9. Example of topic vectors.
Topic term set process:

A topic term set process 250 creates a topic term set 255 from the interpretation matrix 225 and each topic vector 245. Each topic term set is a set of basic terms that describe the topic represented by each topic vector. Multiplying the interpretation matrix and the topic vector, the linear combinations of basic terms associated with the topic vector elements are decoded to the basic terms. More precisely, computing x=P * t where P denotes an interpretation matrix and t denotes a topic vector, the topic vector is converted into a vector x. Each element of x represents the degree of relevance of the topic to each basic term. The topic term set is created by choosing the basic terms whose corresponding elements of x have larger values than other elements.

Table 10 shows an example of topic term set computation.

TABLE 10

Example of topic term set computation.

|  | "Mary Jones" | "Little" | "lamb" | "good buddy" | "veterinarian" | "Cornell Univ." | "Mike Smith" | "programmer" | "IBM" |
|---|---|---|---|---|---|---|---|---|---|
| x for topic #1 [ | 0.45, | 0.22, | 0.67, | 0.22, | 0.22, | 0.45, | 0, | 0, | 0, ] |
| x for topic #2 [ | 0, | 0, | 0, | 0, | 0, | 0, | 0.58, | 0.58, | 0.58 ] |

Topic term set for topic #1 = {"Mary Jones", "lamb", "Cornell University"}
Topic term set for topic #2 = {"Mike Smith", "programmer", "IBM"}

In FIG. 2, a topic-document relevancy process 260 computes topic-document relevance 265 for each pair of a document and a topic from the topic vectors 245 and the document vectors 230. The topic-document relevance represents the degree of relevance of a document to a topic. It is created by computing the cosine between the document vector and the topic vector.

Table 11 shows an example of topic-document relevance computation.

(document #1, topic #1): [0.84, 0, 0.53] [1, 0, 0]$^T$=0.84
(document #1, topic #2): [0.84, 0, 0.53] [0, 1, 0]$^T$=0
(document #2, topic #1): [0.84, 0, −0.53] [1, 0, 0]$^T$=0.84
(document #2, topic #2): [0.84, 0, −0.53] [0, 1, 0]$^T$=0
(document #3, topic #1): [0, 1, 0 ] [1, 0, 0]$^T$=0
(document #3, topic #2): [0, 1, 0 ] [0, 1, 0]$^T$=1

Table 11. Example of topic-document relevance computation.

Figures 5, 5A:
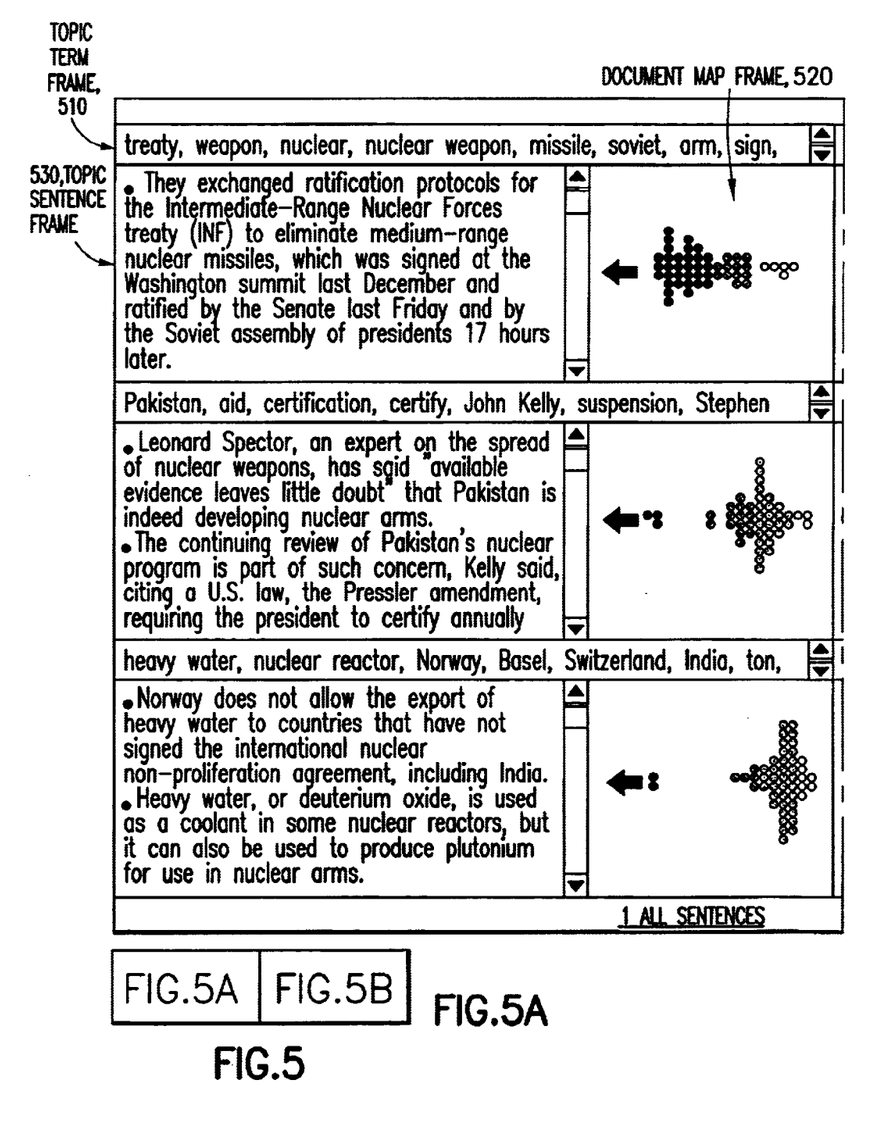
FIG. 5 is a block diagram of an output display.
Figure 5B:
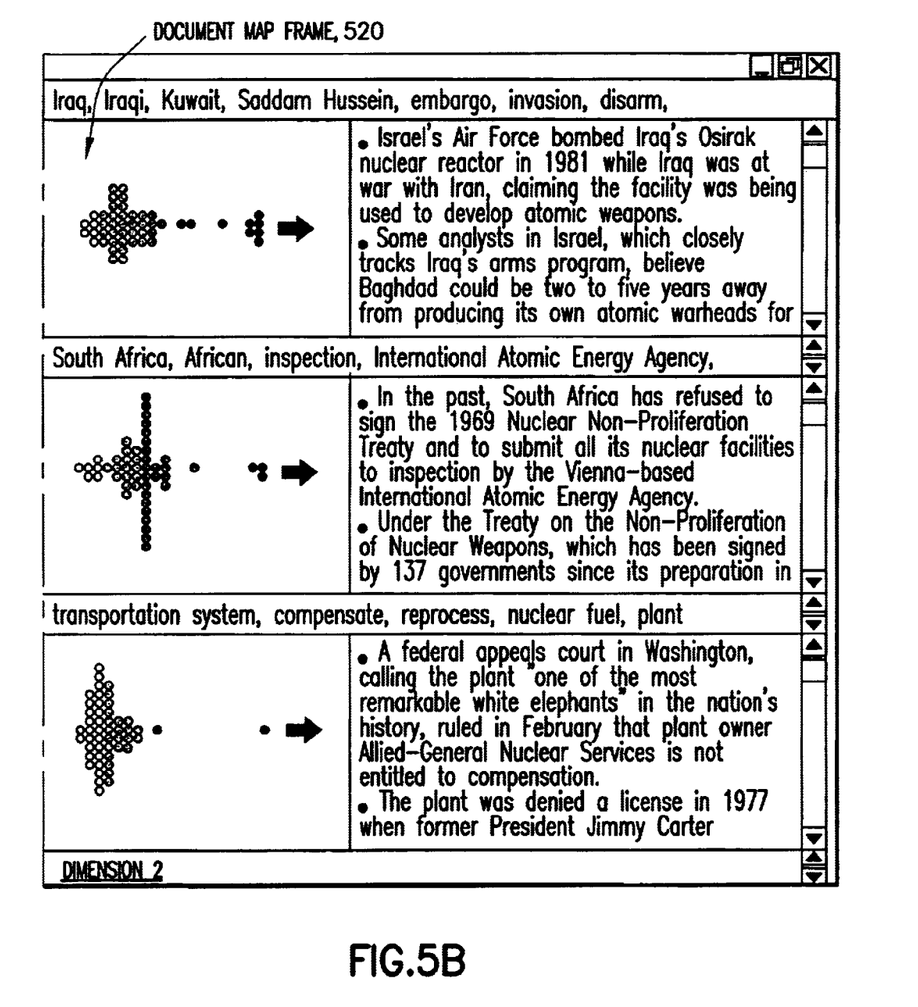

A document map process labeled 280 creates a document map labeled 285 for each topic from the topic-document relevance labeled 265. The document map is a graphical representation of the relevance of the documents to the topic. In the document map, an image object (typically a dot) represents each document. The image object is placed with a horizontal or vertical distance from an original point proportional to the topic-document relevance. The color of the image object represents the degree of topic-document relevance. One way to do this is to change one of RGB values proportional to the square of topic-document relevance while fixing other two of RGB values. An example of the document map may be found in FIG. 5. The details of FIG. 5 are described later.

A topic sentence set process labeled 270 creates a topic sentence set labeled 275 for each topic from the topic vector labeled 245 and the sentence vectors labeled 235. To do this, first the inner product is computed for each pair of the sentence vector and the topic vector as a similarity measurement. Next, a sentence vector is chosen to be a topic sentence vector candidate when the sentence vector is more similar to the topic vector than the other topic vectors. Finally, the topic sentence vector candidate is chosen to be a topic sentence if it is largely similar to the topic vector. One way to choose the topic sentences from the candidates is to choose the sentence vectors whose similarities are more than a threshold. Another way to do this is to choose a fixed number of sentence vectors with the largest similarities (e.g. top 5 sentences).

Table 12 shows an example of topic sentence set computation.

Similarities between the sentence vectors and the topic vectors (sentence #1, topic #1)=[0.89, 0, 0.71] [1, 0, 0]$^T$=0.89,
(sentence #1, topic #2)=0
(sentence #2, topic #1)=0.89, (sentence #2, topic #2)−0
(sentence #3, topic #1)=1.12, (sentence #3, topic #2)=0
(sentence #4, topic #1)=0.89, (sentence #4, topic #2)=0
(sentence #5, topic #1)=0, (sentence #5, topic #2)=1.73

Sentence #1, #2, #3, #4 are the topic sentence candidates for topic #1.
Sentence #5 is the topic sentence candidate for topic #2.
Topic sentence set for topic #1={sentence #3}
Topic sentence set for topic #2={sentence #5}
Table 12. Example of topic sentence set computation.

FIG. 5 shows a non-limiting example of a graphical interface for this invention. Other graphical interfaces are possible. In this example, 6 topics are detected from a set of 50 documents. The topic terms, topic sentences, and the document map for all of the 6 topics are displayed together on the display device 140.

A topic term frame 510 displays the topic terms for the first topic. The topic terms are shown in the order of the relevance to this topic. The frame is scrollable.

A document map frame 520 displays the document map for the first topic. Each dot represents a document. The horizontal placement of each dot represents the degree of relevance of the corresponding document to the topic. Documents closer to the direction of the arrow are more relevant to the topic. The color of the dot also represents the degree of relevance. When a pointing device 160 is over the dot, the color of the dots representing the same document changes in all the document maps. This color change helps the user to understand the relationships between a document and multiple topics quickly. When the dot is clicked, the full text of the corresponding document is displayed.

A topic sentence frame 530 displays the topic sentences for the first topic. The frame is scrollable. When a pointing device 160 is over the dot before the sentence, the dots representing the document that contains that sentence change the color in all the document maps. When the dot before the sentence is clicked, the full text of the document containing that sentence is displayed and the sentence is highlighted.

We claim:

1. A computer system for identifying and describing one or more topics in one or more documents in a document set, the system comprising:
   one or more central processing units and one or more memories;
   a term set process that creates a basic term set from the document set being a set of one or more basic terms of one or more words;
   a document vector process that creates a document vector for each document that has a document vector direction representing what the document is about;
   a topic vector process that creates one or more topic vectors from the document vectors, each topic vector having topic vector direction representing a topic in the document set;

a topic term set process that creates a topic term set for each topic vector that comprises one or more of the basic terms describing the topic represented by the topic vector, each of the basic terms in the topic term set associated with relevancy of the basic term;

a topic-document relevance process that creates a topic-document relevance for each topic vector and each document vector, the topic-document relevance representing relevance of the document to the topic, wherein the topic-document relevance for a given topic vector and a given document vector is determined using corresponding ones of the topic vector directions and the document vector directions, where the topic-document relevance for a given topic vector and a given document vector is determined by computing a cosine between the given topic vector and the given document vector; and a topic sentence set process that creates a topic sentence set for each topic vector that comprises of one or more topic sentences that describe the topic represented by the topic vector, each of the topic sentences associated with relevance of the topic sentence to the topic represented by the topic vector.

2. A system, as in claim 1, where the document process additionally comprises:

a term-document vector process that creates a term-document vector for each document in the document set, the term-document vector having one or more term-document vector elements, each of the term-document vector element being the relevancy of each basic term to the document;

a conversion matrix process that creates a matrix of one or more conversion vectors, called the conversion matrix, from the term-document vectors;

a document vector conversion process that creates a document vector for each document by multiplying the conversion matrix and the term-document vector for the document;

a term-sentence vector process that creates a term-sentence vector for each sentence in each document in the document set, the term-sentence vector having one or more term-sentence vector elements, each of the term-sentence vector elements being the relevance of each basic term to the sentence;

a sentence vector process that creates a sentence vector for each sentence by multiplying the conversion matrix and the term-sentence vector for the sentence; and an interpretation matrix process that creates an interpretation matrix from the conversion matrix.

3. A system, as in claim 2, where the topic term set process creates a topic term set for each topic vector by selecting one or more of the basic terms having large values of the products of the interpretation matrix and the topic vector.

4. A system, as in claim 2, where the topic sentence set process creates a topic sentence set for each topic vector by selecting the sentence represented by the sentence vector that has a large sentence vector magnitude and a large direction similarity to the topic vector.

5. A system, as in claim 1, comprising a document map for each topic vector, the document map having one or more document image objects, each of the document image objects associated with each document, each of the document image objects positioned and colored based on the topic-document relevancy.

6. A system, as in claim 5, where more than one document map is displayed and when a mouse or other pointing device is over a document image object in a document map, the color of the document image objects representing the document are changed in all the document maps.

7. A system, as in claim 5, where a document map has an indicator image object that indicates the direction of positional change of the document image object which represents larger relevance of the document to the topic.

8. A system, as in claim 5, where full text of the document is displayed when the corresponding document image object in the document map is selected with a mouse or other pointing device.

9. A system, as in claim 1, comprising a topic sentence frame for each topic vector, the topic sentence frame in which one or more topic sentences of the topic sentence set for the topic vector are displayed.

10. A system, as in claim 9, where a document map and a sentence frame for each topic vector are displayed.

11. A system, as in claim 10, where each topic sentence displayed in the sentence frame is associated with an image object, called a sentence image object and when a mouse or other pointing device is over the sentence image object, the color of the document image objects representing the document containing that sentence are changed.

12. A system, as in claim 10, where full text of the document is displayed when the sentence image object associated with the sentence contained in that document is clicked by mouse or other pointing devices.

13. A system, as in claim 12, where the sentence associated with the clicked sentence image object is highlighted when full text of the document is displayed.

14. A method, executing on a computer, for identifying and describing one or more topics in one or more documents in a document set, the method comprising the steps of:

creating a basic term set from the document set being a set of one or more basic terms of one or more words;

creating a document vector for each document that has a document vector direction representing what the document is about;

creating one or more topic vectors from the document vectors, each topic vector having topic vector direction representing a topic in the document set;

creating a topic term set for each topic vector that comprises one or more of the basic terms describing the topic represented by the topic vector, each of the basic terms in the topic term set associated with relevancy of the basic term;

creating a topic-document relevance for each topic vector and each document vector, the topic-document relevance representing relevance of the document to the topic, wherein the topic-document relevance for a given topic vector and a given document vector is determined using corresponding ones of the topic vector directions and the document vector directions, where the topic-document relevance for a given topic vector and a given document vector is determined by computing a cosine between the given topic vector and the given document vector; and creating a topic sentence set for each topic vector that comprises of one or more topic sentences that describe the topic represented by the topic vector, each of the topic sentences associated with relevance of the topic sentence to the topic represented by the topic vector.

15. A computer system for identifying and describing one or more topics in one or more documents in a document set, the system comprising:

means for creating a basic term set from the document set being a set of one or more basic terms of one or more words;

means for creating a document vector for each document that has a document vector direction representing what the document is about;

means for creating one or more topic vectors from the document vectors, each topic vector having topic vector direction representing a topic in the document set;

means for creating a topic term set for each topic vector that comprises one or more of the basic terms describing the topic represented by the topic vector, each of the basic terms in the topic term set associated with relevancy of the basic term;

means for creating a topic-document relevance for each topic vector and each document vector, the topic-document relevance representing relevance of the document to the topic, wherein the topic-document relevance for a given topic vector and a given document vector is determined using corresponding ones of the topic vector directions and the document vector directions, where the topic-document relevance for a given topic vector and a given document vector is determined by computing a cosine between the given topic Vector and the given document vector; and means for creating a topic sentence set for each topic vector that comprises of one or more topic sentences that describe the topic represented by the topic vector, each of the topic sentences associated with relevance of the topic sentence to the topic represented by the topic vector.

16. A computer program product, for identifying and describing one or more topics in one or more documents in a document set, which performs the steps of:

creating a basic term set from the document set being a set of one or more basic terms of one or more words;

creating a document vector for each document that has a document vector direction representing what the document is about;

creating one or more topic vectors from the document vectors, each topic vector having topic vector direction representing a topic in the document set;

creating a topic term set for each topic vector that comprises one or more of the basic terms describing the topic represented by the topic vector, each of the basic terms in the topic term set associated with relevancy of the basic term;

creating a topic-document relevance for each topic vector and each document vector, the topic-document relevance representing relevance of the document to the topic, wherein the topic-document relevance for a given topic vector and a given document vector is determined using corresponding ones of the topic vector directions and the document vector directions, where the topic-document relevance for a given topic vector and a given document vector is determined by computing a cosine between the given topic vector and the given document vector; and creating a topic sentence set for each topic vector that comprises of one or more topic sentences that describe the topic represented by the topic vector, each of the topic sentences associated with relevance of the topic sentence to the topic represented by the topic vector.

\* \* \* \* \*

UNITED STATES PATENT AND TRADEMARK OFFICE
CERTIFICATE OF CORRECTION

PATENT NO. : 6,775,677 B1
DATED : August 10, 2004
INVENTOR(S) : Ando et al.

It is certified that error appears in the above-identified patent and that said Letters Patent is hereby corrected as shown below:

Column 6,
Lines 19-20, before "where" and after "i.e." replace "$[d_i... d_n]$" with -- $[d_1... d_n]$ --.
Line 28, before "is" and after "k," replace "$B=[b_l...b_k]$" with -- $B=[b_1...b_k]$ --.

Column 7,
Line 31, before "where" and after "matrix" replace "$[u_l...u_m]$" with -- $[u_1...u_m]$ --.

Column 8,
Line 38, replace "Document #3 [0 0 1 0]" with -- Document #3 [0 1 0] --.

Column 9,
Line 41, before "topic" and after "The" delete -- t --.

Column 11,
Line 67, replace "(sentence #2, topic #2) – 0" with -- (sentence #2, topic #2) = 0 --.

Signed and Sealed this

Twentieth Day of September, 2005

JON W. DUDAS
*Director of the United States Patent and Trademark Office*